Patented Nov. 12, 1935

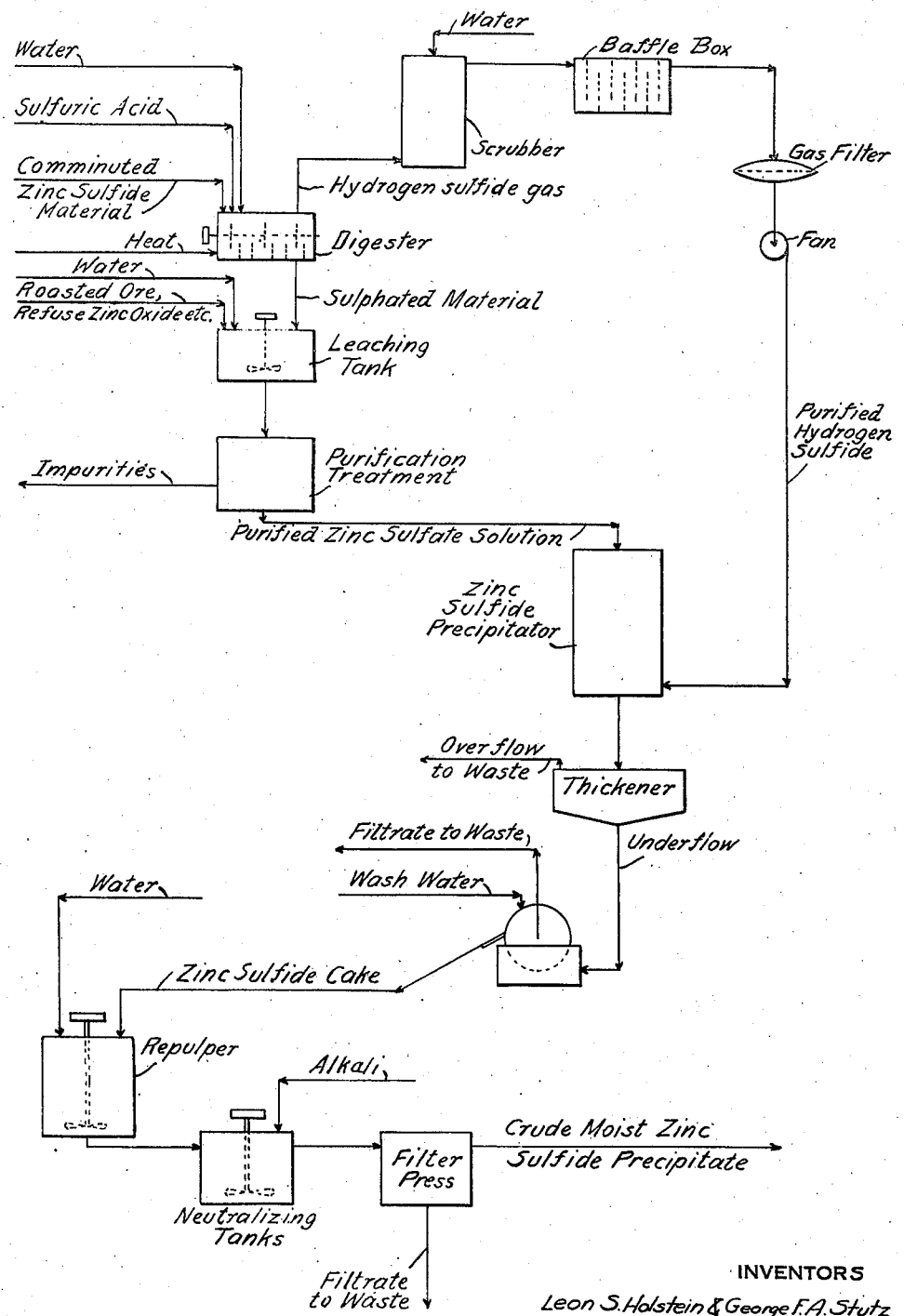

2,020,313

UNITED STATES PATENT OFFICE 2,020,313

ZINC SULPHIDE

Leon S. Holstein, Great Neck, N. Y., and George F. A. Stutz, Palmerton, Pa., assignors to The New Jersey Zinc Company, New York, N. Y., a corporation of New Jersey Application May 19, 1931, Serial No. 538,611

8 Claims. (Cl. 23—135)

This invention relates to zinc sulphide, and has for its object the provision of an improved method of making zinc sulphide suitable for pigment purposes. More particularly the invention contemplates a cyclic method of treating zinc sulphide materials for the production of pigment zinc sulphide.

The zinc sulphide content of sulphidic zinciferous ores, concentrates and similar products is usually present in crystalline form admixed with a considerable proportion of earthy, gangue or other foreign material. Even when finely divided or comminuted, as in a zinc flotation concentrate, the individual particles of crystalline zinc sulphide are of relatively huge size, as compared with the permissible particle size in pigment zinc sulphide. The zinc sulphide crystals in the ore are moreover generally contaminated with substances in solid solution or held in chemical combination.

The present invention involves a cyclic method of treating such zinciferous materials containing zinc sulphide in the course of which the zinc sulphide is converted by appropriate treatment with sulphuric acid to zinc sulphate with the production of hydrogen sulphide gas, and subsequently an appropriately purified and diluted solution of the resulting zinc sulphate is treated with the resulting hydrogen sulphide gas to precipitate zinc sulphide under conditions appropriate for the ultimate production of a pigment product. Any suitable source of zinc sulphide may be utilized as the initial raw material, such, for example, as a zinc sulphide (blende) ore, concentrate or the like. Preferably, such ore concentrate or other zinc sulphide material contains a relatively high percentage of zinc sulphide, with only a relatively small percentage of other metal sulphides, such as cadmium, lead, iron, etc. Crude ores and other products containing zinc sulphide are preferably subjected to appropriate preliminary treatment for concentrating the zinc sulphide content thereof. Where practicable the concentration treatment is preferential, such, for example, as a differential flotation treatment of a mixed zinc-lead sulphide ore for the production of a zinc concentrate relatively low in lead. Differential zinc flotation concentrates are particularly well adapted for use in the practice of the invention. The single figure of the accompanying drawing is a diagrammatic flow sheet illustrative of a preferred mode of practicing the invention.

The zinc sulphide material is first comminuted to a relatively fine degree of sub-division, in order to promote intimate mixing and reaction with sulphuric acid. Zinc flotation concentrates are sufficiently comminuted for the purpose of the invention. The finely ground or otherwise appropriately comminuted zinc sulphide material is treated with sulphuric acid of 52° Bé. (about 65% $H_2SO_4$) at a temperature not higher than 150° C. This treatment is carried out during continuous agitation. An appropriate apparatus consists of a mixer, in the form of an externally heated iron tank equipped with stirring means, such as paddles. The stirring is preferably carried out so as to fluff up rather than to densify the mixture. The stirring paddles of the mixer are advantageously made of cast iron, the surface of which has been hardened for protection against the severe abrasion to which the paddles are subjected by the mixture of ore (or other zinc sulphide material) and sulphuric acid. The shell of the mixing tank is preferably kept hot enough to retain on the inner surface thereof a baked dry coating of ore and zinc sulphate to protect it from abrasion.

It is advantageous to use an amount of sulphuric acid about 30% in excess of the chemical equivalent of the zinc sulphide and other sulphides present in the ore (or other material undergoing treatment), although in many cases less sulphuric acid need be used. It is likewise advantageous to supply the sulphuric acid as 60° Bé. or 66° Bé. acid, and to dilute it to 52° Bé. by water simultaneously added. Since 150° C. is approximately the boiling temperature of 52° Bé. sulphuric acid, the concentration of the acid in the mixture is automatically maintained at about 52° Bé. by maintaining the temperature at 150° C. Maintenance of the concentration of the unconsumed sulphuric acid at 52° Bé. during the treatment or digestion of the zinc sulphide material with the acid is of greater importance than the temperature of the mixture. Temperatures as low as 110° C. may be used with satisfactory results. Where the digestion temperature is lower than 150° C., the concentration of the unconsumed sulphuric acid in the mixture may be conveniently maintained at substantially 52° Bé. by progressively adding appropriate amounts of concentrated sulphuric acid to the mixer. Where the concentration of the sulphuric acid varies substantially from 52° Bé., difficulties are encountered in the digestion treatment. If the acid is more dilute, the reaction is retarded. If the acid is more concentrated, it reacts with the evolved hydrogen sulphide gas with the ultimate formation of elemental sulphur and water;

a disadvantageous reaction because of (1) loss of sulphuric acid, (2) loss of hydrogen sulphide and (3) clogging of the gas lines with elemental sulphur.

The reaction between the zinc sulphide material and the sulphuric acid is preferably so conducted that the resulting zinc sulphate crystallizes out of the reaction mixture as solid zinc sulphate, so that the treated material is discharged from the mixer as a substantially dry product. The hydrogen sulphide gas evolved during the digestion treatment is led off from the mixer or reaction vessel to appropriate apparatus for purification, storage or immediate use in the cyclic process. It is advantageous to conduct the operation so that the gas withdrawn from the mixer, as for example by a suction device or other suitable instrumentality, contains about 80% hydrogen sulphide.

The zinc sulphate conversion product of the digestion treatment is leached with water to obtain an aqueous zinc sulphate solution (acidified by the sulphuric acid added in excess in the digestion treatment). Because of the presence of the excess sulphuric acid, it is desirable to add some zinciferous material adapted to neutralize this acid by converting it to zinc sulphate. Such added zinciferous material may be roasted zinc blende, roasted zinc flotation concentrate, refuse zinc oxide, or the like.

The resulting solution contains not only zinc sulphate but also sulphates of other materials present in the ore (or other zinc sulphide material) that form soluble sulphates. The presence of soluble magnesium sulphate in this solution may be obviated when treating zinc sulphide ores by removing the magnesium from the ore or concentrate before its treatment with sulphuric acid, in the manner described in the United States patents of W. O. Borcherdt No. 1,799,278, issued April 7, 1931, or of W. C. Hooey, No. 1,799,166, issued April 7, 1931. The iron, manganese and cadmium present in the ore will enter the solution of zinc sulphate obtained by leaching with water in the form of ferrous sulphate, manganous sulphate and cadmium sulphate. The iron may be advantageously removed by oxidizing the ferrous iron to insoluble ferric hydroxide by aeration in the presence of a small amount of a copper salt (e. g. copper sulphate) added if necessary to the solution for its catalytic effect in the oxidizing action. Sufficient zinc oxide or other appropriate base should also be present in the solution to neutralize the acid liberated by the hydrolysis of the ferric compounds formed by the oxidation. The pH value of the solution should be maintained at about 4.8 during this operation. If necessary, about 0.05 grams Cu are added per liter of solution containing 108 grams Zn per liter. Other metal impurities may be removed in ways well understood in the art of purifying zinc sulphate solution in preparation for the manufacture of lithopone or for the electrolytic deposition of metallic zinc. Manganous sulphate may be precipitated by oxidation with potassium permanganate. Cadmium and copper (added as catalyst or otherwise present) may be precipitated by adding zinc dust to the solution.

The appropriately purified zinc sulphate solution is now ready for treatment with hydrogen sulphide gas. The hydrogen sulphide gas withdrawn from the hereinbefore described digestion operation is appropriately cleaned or purified and brought into intimate contact with the dilute zinc sulphate solution. In practice, it is usually sufficient to pass the gas withdrawn from the digestion operation through a gas scrubber where it is washed with water, then through a baffle box and finally through a gas filter, thereby producing an adequately clean and pure gas containing about 80% hydrogen sulphide. The zinc sulphate solution should be of a sufficient degree of dilution to prevent such a concentration of sulphuric acid (resulting from the precipitating reaction) as might redissolve the precipitated zinc sulphide. In practice, a zinc sulphate solution of about 10° Bé., that is, 0.26 pounds Zn per gallon, is satisfactory for the purpose of the invention.

Intimate contact of the dilute solution of zinc sulphate with hydrogen sulphide gas may be brought about in any appropriate form of apparatus. Precipitation is preferably carried out at a temperature of about 60° C. Preferably the precipitation is conducted so that the liquid and the gas are in counter-current flow, that is, the zinc sulphate entering the precipitating apparatus first comes in contact with gas from which most of the hydrogen sulphide has been removed. Likewise, the strong hydrogen sulphide gas entering the apparatus first comes in contact with liquor in which most of the zinc sulphate has been converted into zinc sulphide. Thus, in the body of liquor or slurry undergoing precipitation there is a progressively decreasing concentration of the zinc sulphate and a progressively increasing concentration of hydrogen sulphide.

When the zinc sulphate has been substantially precipitated as zinc sulphide, the resulting suspension of zinc sulphide in dilute sulphuric acid (e. g. 43 to 50 grams zinc sulphide per liter) is discharged into a thicker, or other appropriate apparatus, where the precipitate is settled and excess liquor removed. The precipitate increases in particle size by ageing in the thickener to such a degree that it can be more readily filtered and that the finished product has improved hiding power. The time of ageing required is a function of the temperature at which the precipitation is carried out, the temperature at which the ageing is carried out, and the acid concentration of the liquor in which the ageing is carried out. Where the temperature of the liquor during precipitation is maintained at 60° C., an ageing treatment of about eighteen (18) hours in the thickener or equivalent apparatus at resulting temperatures and acid concentrations gives satisfactory results.

After discharge from the thickener, the precipitate is filtered and washed, as for example on a rotary filter. The filter cake is then re-pulped with water and the resulting pulp transferred to neutralizing tanks. The slurry is treated with alkali in the neutralizing tanks to neutralize the remnants of sulphuric acid in the pulp and to render it alkaline and hard enough for subsequent calcination. Barium hydroxide, calcium hydroxide and barium sulphide are suitable alkaline substances for neutralizing. If barium sulphide is used, the endpoint of neutralization is preferably established and determined by separate titration of the OH and SH ions in the manner described in the United States patents of W. C. Hooey, Nos. 1,759,115 and 1,759,116.

After neutralizing, the slurry is filter pressed, dried, calcined, quenched, ground wet in a ball mill, filter pressed, dried and disintegrated. While this is the preferred finishing practice, any other equivalent procedure for obtaining a suitable pigment product may be used. The zinc sulphide content of the product will ordinarily be not less than 93%. The small amounts of other substances, such as calcium sulphate, barium sulphate, etc. present in the product have no deleterious effect on its pigment properties.

We claim:

1. A cyclic process of treating zinc sulphide-bearing material for the production of pigment zinc sulphide which comprises, heating and mixing the zinc sulphide-bearing material in finely sub-divided form with concentrated sulphuric acid in excess of the chemical equivalent of the zinc sulphide and other metallic sulphides present in the sulphide-bearing material, the sulphuric acid being present in amount and concentration adapted to produce an active evolution of hydrogen sulphide gas with the conversion of the zinc sulphide to zinc sulphate without the objectionable formation of elemental sulphur, subjecting the zinc sulphate conversion product so obtained to a purification operation to obtain a substantially pure aqueous solution of zinc sulphate, withdrawing and subjecting the hydrogen sulphide bearing gaseous conversion product so obtained to a purification operation to obtain a substantially pure and concentrated hydrogen sulphide gas, and treating the purified solution of zinc sulphate with the purified hydrogen sulphide gas to obtain a zinc sulphide precipitate.

2. The cyclic process of treating zinc sulphide material for the production of pigment zinc sulphide which comprises, heating and mixing the zinc sulphide material with sulphuric acid to convert zinc sulphide to zinc sulphate and to evolve hydrogen sulphide, the sulphuric acid being used in such an amount and at such concentration as to inhibit the formation of elemental sulphur while permitting the rapid evolution of hydrogen sulphide, collecting the evolved hydrogen sulphide, treating the resultant product containing the zinc sulphate to obtain an aqueous solution of zinc sulphate, appropriately purifying said aqueous solution of zinc sulphate, and treating the resulting purified solution of zinc sulphate with the hydrogen sulphide collected as aforesaid to obtain a zinc sulphide precipitate.

3. The cyclic process of treating zinc sulphide material for the production of pigment zinc sulphide which comprises, subjecting zinc sulphide material to the action of sulphuric acid thereby converting zinc sulphide to zinc sulphate and evolving hydrogen sulphide, the sulphuric acid being used in such an amount and at such concentration as to inhibit the formation of elemental sulphur while permitting the rapid evolution of hydrogen sulphide, collecting the evolved hydrogen sulphide, treating the resultant product containing the zinc sulphate to obtain an aqueous solution of zinc sulphate and subjecting said aqueous solution of zinc sulphate to intimate contact with said hydrogen sulphide to obtain zinc sulphide precipitate.

4. The cyclic process of treating zinc sulphide material for the production of pigment zinc sulphide which comprises, heating and mixing the zinc sulphide material with sulphuric acid in such an amount and of such concentration as to convert the zinc sulphide to zinc sulphate and to produce an active evolution of hydrogen sulphide while inhibiting the formation of elemental sulphur, treating the conversion product containing the zinc sulphate to obtain an aqueous solution of zinc sulphate, and treating the resulting solution of zinc sulphate with said hydrogen sulphide to precipitate zinc sulphide.

5. The cyclic process of treating zinc sulphide material for the production of pigment zinc sulphide which comprises treating the zinc sulphide material with sulphuric acid to convert zinc sulphide to zinc sulphate and to produce hydrogen sulphide, the sulphuric acid being used in such amount and at such concentration as to inhibit the formation of elemental sulphur while permitting the rapid evolution of hydrogen sulphide, collecting the evolved hydrogen sulphide, treating the product containing the zinc sulphate to obtain an aqueous solution of zinc sulphate, appropriately purifying said aqueous solution of zinc sulphate, and treating the purified zinc sulphate solution with the hydrogen sulphide collected as aforesaid to precipitate pigment zinc sulphide.

6. A method of producing zinc sulphide which comprises treating zinc blende with sulphuric acid to produce zinc sulphate and hydrogen sulphide, preparing purified zinc sulphate solution from the zinc sulphate thus obtained, and precipitating zinc sulphide therefrom with the hydrogen sulphide gas obtained in the said treatment of the zinc blende with the sulphuric acid.

7. A cyclic process of treating zinc sulphide material for the production of pigment zinc sulphide according to claim 5, in which the purified zinc sulphate solution is brought into contact with the hydrogen sulphide gas at progressively increasing concentrations.

8. A cyclic process of treating zinc sulphide material for the production of pigment zinc sulphide according to claim 5, in which said collected hydrogen sulphide gas is introduced into a body of previously hydrogen sulphide gas treated zinc sulphate solution to form a slurry of zinc sulphide precipitate, the unconsumed and diluted hydrogen sulphide gas remaining from this last step then being brought into intimate contact with said purified zinc sulphate solution.

LEON S. HOLSTEIN.
GEORGE F. A. STUTZ.